Patented Feb. 6, 1945

2,368,709

UNITED STATES PATENT OFFICE 2,368,709

INSECTICIDE

Mortimer T. Harvey, East Orange, N. J., assignor to The Harvel Corporation, a corporation of New Jersey No Drawing. Application January 25, 1941, Serial No. 375,935

3 Claims. (Cl. 167—24)

The present invention relates to reaction products of free chlorine with liquids obtained from the Anacardiaceae family of trees and of free chlorine with certain derivatives of such liquids, and the present invention relates to methods and steps for making and using the products of the present invention.

Illustrative examples of liquids of the Anacardiaceae family of trees and cashew nut shell liquid, marking nut shell liquid, Japanese lac, and their constituents including anacardic acid, cardol, anacardol and urushiol, and illustrative examples of derivatives of these liquids are cardanol, the residue such as is left by the distillation of cashew nut shell liquid with steam to obtain cardanol, the residue from the steam distillation of marking nut shell liquid and the distillate of the distillation and the hydrocarbon ethers of this residue and this distillate, hydrocarbon ethers of cardanol, hydrocarbon ethers of cashew nut shell liquid, hydrocarbon ethers of cardol, hydrocarbon ethers of marking nut shell liquid, hydrocarbon ethers of anacardol, hydrocarbon ethers of Japanese lac and any one or more of the above examples in the polymerized or copolymerized state, for illustrative examples, polymerized cashew nut shell liquid, polymerized anacardic acid, polymerized cardol, polymerized cardanol, polymerized marking nut shell liquid, polymerized Japanese lac and polymerized residues of the steam distillation of cashew nut shell liquid, anacardic acid, marking nut shell liquid and Japanese lac. Herein steam distillation is merely illustrative of various methods of distillation of various of the above products, distillation at normal pressure without steam and distillation at pressure below and above normal and with or without steam, in both cases, also being suitable for some purposes.

One of the advantages of the methods and products of the present invention is that reaction of free chlorine with cashew nut shell liquid, marking nut shell liquid or Japanese lac or products thereof reduces or completely eliminates the natural vesicant action of these liquids and products.

The chlorination can be carried to various degrees or amounts of chlorination.

The chlorination process of the present invention causes a thickening of the material chlorinated, to a degree according to the amount of chlorination.

For illustrative examples, cashew nut shell liquid which has been carried to a degree sufficient to eliminate the natural vesicating action thereof will be thicker in viscosity than the original cashew nut shell liquid and the chlorination can be carried on to a stage where the chlorination product is still thicker.

The materials chlorinated in the practice of the present invention are phenols having unsaturated hydrocarbon substituents on the aryl nucleus or derivatives of these such as the hydrocarbon ethers thereof, illustrative examples of which are given above, and it is considered that the chlorination can take place at the points of unsaturation of the hydrocarbon substituent and on the aryl nucleus, the final status depending on the degree of chlorination.

The chlorination products of the present invention are suitable for use as such for various purposes and are also suitable for preparation for use by further chemical reactions with other reagents to suit various purposes and uses. For example, chlorinated products of the present invention can be reacted with aldehydes and related reagents, for illustrative examples, formaldehyde, furfuraldehyde, paraformaldehyde and hexamethylamine to produce condensation products of the phenol-aldehyde type. Certain chlorinated products of the present invention can be polymerized with polymerizing agents depending on the degree of chlorination at the unsaturated bond of the hydrocarbon substituent. And certain of these polymerized chlorination products can be condensed with aldehydes or related agents to produce condensation products of the phenol-aldehyde type. Chlorination products of the present invention can be sulphonated for various uses such as for use as wetting agents and detergents.

A particular illustrative use of chlorinated products of the present invention is for the solution of rotenone containing products such as derris root extract in which a chlorinated product of the present invention, for illustrative examples, chlorinated cashew nut shell liquid and chlorinated cardanol, acts as a cosolvent for bringing the rotenone product into solution in a petroleum oil.

Illustrative examples of the practice of the present invention are given as follows:

*Example 1.*—Chlorine gas was bubbled through a predetermined weight of cashew nut shell liquid until the latter had taken up a quantity of chlorine equal in weight to the said predetermined weight, that is until the resulting weight was equal to twice that of the predetermined weight of the cashew nut shell liquid.

*Example 2.*—The following is a list of general examples of chlorinated cashew nut shell liquid suitable for various uses and obtained by bubbling chlorine gas through cashew nut shell liquid at room temperature, the table showing the amounts by weight of chlorine added to the cashew nut shell liquid during the chlorination process, the starting material being 250 parts by weight of cashew nut shell liquid in 250 parts of petroleum oil "Varnoline":

| Days of 24 hours of chlorination | Weight picked up |
|---|---|
| | Parts |
| 1 | 74 |
| 2 | 137 |
| 3 | 227 |
| 4 | 272 |
| 5 | 374 |
| 6 | 374 |
| 7 | 370 |

One hundred and twenty-five parts of the finally chlorinated material and one hundred and twenty-five parts of water were shaken together well, then twenty-five grams of the water when removed required twenty-five cubic centimeters of 1/10th normal NaOH solution for neutralization.

Example 3.—One hundred parts by weight of cashew nut shell liquid was chlorinated by bubbling chlorine gas through it until it picked up five parts by weight of chlorine.

a. A water solution of NaOH was shaken with the chlorinated cashew nut shell liquid of this example until a sample of the water was neutral, then the chlorinated cashew nut shell liquid was dehydrated by heating to about 250° F. to 240° F., and any sodium salts precipitated were separated by filtering as in a filter press. The product is a liquid of a viscosity which is only slightly heavier than the cashew nut shell liquid.

Example 4.—Any of the chlorination products of Examples 2 and 3, either in any of the chlorination steps given or at intermediate steps, can be used alone or the condensation products of said chlorinated products and aldehyde may also be used as a solvent in insecticides.

Example 5.—The derivatives of cashew nut shell liquid described in U. S. Patent Number 2,181,119 to S. Caplan, Nov. 28, 1939, can be chlorinated as by bubbling chlorine gas through those which are in the liquid state either at normal or elevated temperatures and through solutions of them in a suitable solvent such as a petroleum oil "Varnoline," to obtain various degrees of chlorination. For illustrative examples, cardanol and the residue obtained upon the steam distillation of cashew nut shell liquid to obtain cardanol can be chlorinated to various degrees ranging from 1% or less up to about the weight at the start of the material being chlorinated to obtain reaction products and final manufactured products of the nature of those described and by the methods described therein.

The aldehyde which may be employed for the production of said condensation products may be formaldehyde, paraformaldehyde, furfuraldehyde and hexamethylene tetramine.

Example 6.—As illustrative examples, either the chlorinated cashew nut shell liquid or the chlorinated cardanol of Examples 3 and 5, above, can be used as a co-solvent for rotenone products and petroleum oils for spraying as an agricultural or other insecticide. For examples, one part by weight of derris extract and ten parts of chlorinated cashew nut shell liquid (5% chlorination) can be heated together to obtain a solution which at normal temperature can be thinned with kerosene in any proportions. A similar product made with chlorinated cardanol (5% chlorination) can be melted with derris extract, ten parts by weight of the former to one of the latter, to obtain a solution which when cold will dissolve in kerosene in various proportions up to one hundred parts by weight of kerosene.

Example 7.—In each of the examples above, polymerized cashew nut shell liquid can be used in place of the cashew nut shell liquid or cardanol or other cashew nut shell liquid products involved, selection of polymerized cashew nut shell liquid of a degree of viscosity suitable to the purpose of the products used being made. Polymerized cashew nut shell liquid of various consistencies and methods of producing them are described in U. S. Patent Numbers 2,067,919 and 2,128,247 to Harvey and Damitz and number 2,179,059 to Caplan.

Example 8.—As a general example it is noted that marking nut shell liquid and Japanese lac (urushiol) can be used in the practice of the present invention by the methods of examples above, with regard to and variations in accordance with rates of reactions and viscosities, within the skill of the art.

The aforementioned chlorinated products as well as the condensation product produced by reacting an aldehyde therewith may be employed as components of insecticides. The insecticide may comprise a solution of material selected from the group consisting of insecticidal rotenone products and pyrethrin products in a petroleum solvent with a chlorinated phenol having an unsaturated hydrocarbon substituent having from 14 to 28 carbon atoms as co-solvent, said chlorinated phenol being present in from about 5 to 20% by weight of the petroleum oil and said insecticidal product being present in from about 5 to 20% by weight of said chlorinated phenol. The insecticide may also comprise a solution of a material selected from the group consisting of insecticidal rotenone products and pyrethrin products in a petroleum solvent with a condensation product of an aldehyde and a chlorinated phenol having an unsaturated hydrocarbon substituent having from 14 to 28 carbon atoms as a co-solvent, said chlorinated phenol condensation product being present in from about 5 to 20% by weight of the petroleum oil and said insecticide product being present in from about 5 to 20% by weight of said chlorinated phenol condensation product.

In the claims hereof the term "aldehyde" and "material having a reactive methylene group" and similar terms are considered to include hexamethylene tetramine and furfuraldehyde and other materials related to formaldehyde in the condensation reaction with phenols. The term "phenols having an unsaturated hydrocarbon group having an unsaturated bond" are considered to generically and specifically relate to phenols of the Anacardiaceae family and to their equivalents.

Having thus described my invention, what I claim and desire to protect by Letters Patent is:

1. An insecticide comprising a solution of an insecticidal rotenone product in a petroleum solvent with a chlorinated phenol having an unsaturated hydrocarbon substituent having from fourteen to twenty-eight carbons as a cosolvent, said chlorinated phenol being present in from about five to twenty per cent by weight of the petroleum oil and the said insecticidal product being present in from about five to twenty per cent by weight of said chlorinated phenol.

2. An insecticide comprising a solution of an insecticidal rotenone product in a petroleum solvent with a condensation product of an aldehyde and a chlorinated phenol having an unsaturated hydrocarbon substituent having from fourteen to twenty-eight carbons as a cosolvent, said chlorinated phenol condensation product being present in from about five to twenty per cent by weight of the petroleum oil and the said insecticidal product being present in from about five to twenty per cent by weight of said chlorinated phenol condensation product.

3. An insecticide comprising a solution of an insecticidal rotenone product in a petroleum solvent with a chlorinated phenolic material having an unsaturated hydrocarbon substituent having from fourteen to twenty-eight carbons as a cosolvent, said chlorinated phenolic material being present in from about five to twenty per cent by weight of the petroleum oil and the said insecticidal product being present in from about five to twenty per cent by weight of said chlorinated phenolic material.

MORTIMER T. HARVEY.